United States Patent
Liu et al.

(10) Patent No.: US 7,933,124 B2
(45) Date of Patent: Apr. 26, 2011

(54) ELECTRONIC DEVICE WITH EXPANSION CARD FASTERNING DEVICE

(75) Inventors: Yu-Rong Liu, Shenzhen (CN); Jian-Hua Li, Shenzhen (CN); Tao-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 86 days.

(21) Appl. No.: 12/546,704

(22) Filed: Aug. 25, 2009

(65) Prior Publication Data

US 2010/0259894 A1   Oct. 14, 2010

(30) Foreign Application Priority Data

Apr. 9, 2009   (CN) .......................... 2009 1 0301454

(51) Int. Cl.
*H05K 7/20* (2006.01)
*H05K 7/12* (2006.01)

(52) U.S. Cl. ........ 361/688; 361/690; 361/715; 361/719; 361/740; 361/759; 361/801

(58) Field of Classification Search ........................ None
See application file for complete search history.

(56) References Cited

U.S. PATENT DOCUMENTS

| | | | | |
|---|---|---|---|---|
| 5,475,563 | A * | 12/1995 | Donahoe et al. | 361/695 |
| 5,793,609 | A * | 8/1998 | Donahoe et al. | 361/695 |
| 5,861,873 | A * | 1/1999 | Kikinis | 345/157 |
| 5,966,289 | A * | 10/1999 | Hastings et al. | 361/704 |
| 6,882,533 | B2 * | 4/2005 | Bash et al. | 361/696 |
| 7,023,701 | B2 * | 4/2006 | Stocken et al. | 361/704 |
| 7,733,652 | B2 * | 6/2010 | Costello et al. | 361/704 |
| 7,869,215 | B2 * | 1/2011 | Hung et al. | 361/704 |
| 2008/0296000 | A1 * | 12/2008 | Lyon | 165/104.33 |
| 2009/0080151 | A1 * | 3/2009 | Kalms et al. | 361/679.52 |

* cited by examiner

Primary Examiner — Gregory D Thompson
(74) Attorney, Agent, or Firm — Zhigang Ma

(57) ABSTRACT

An electronic device includes a circuit board, an extension card, a cooling device, and a connecting member. The extension card is coupled to the circuit board. The cooling device includes an outer casing and an inner casing received in the outer casing. The connecting member includes a fixing end and an engaging end opposite to the fixing end. The fixing end is fixedly mounted on the outer casing. The engaging end is configured for fastening the extension card on the circuit board. The outer casing moves between a first position where the engaging end fastens the extension card and a second position where the engaging end is separated from the extension card to unfasten the extension card.

13 Claims, 6 Drawing Sheets

ELECTRONIC DEVICE WITH EXPANSION CARD FASTERNING DEVICE

BACKGROUND

1. Technical Field

The present disclosure relates to an electronic device with an expansion card fastening device.

2. Description of Related Art

A personal computer generally includes a case, a motherboard fixed in the case, some extension cards electrically plugged onto the motherboard, and a cooling device. Such extension cards may include an extension graphics card and an extension sound card. During use of the personal computer, these extension cards may be unplugged from and plugged into the motherboard many times. As a result, the extension cards may no longer be securely and reliably connected to the motherboard.

Therefore, there is a need for an electronic device, in which the above problem is eliminated or at least alleviated.

DETAILED DESCRIPTION

Figure 1:
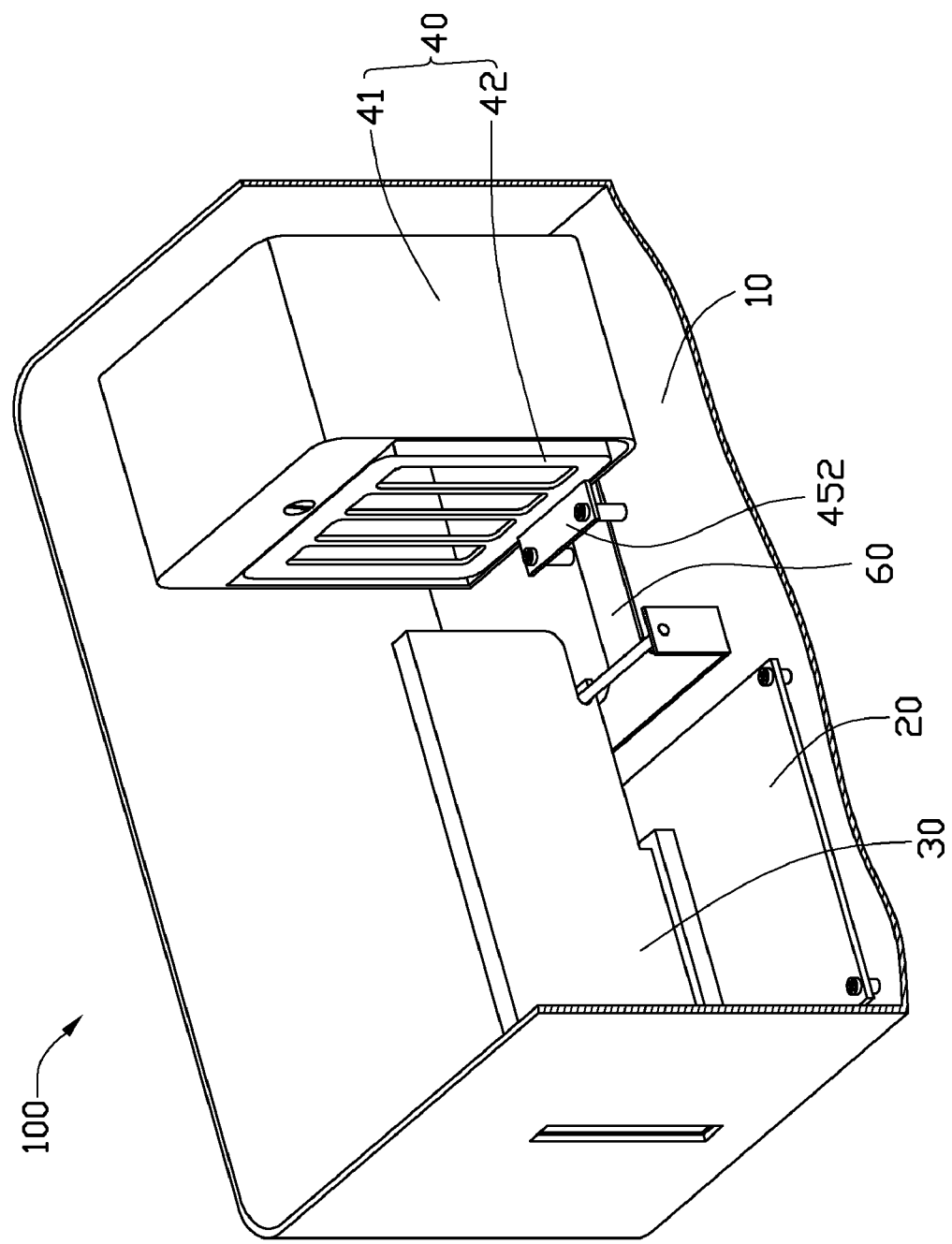
FIG. 1 is a partial, isometric and schematic view of an electronic device including a cooling device, according to an exemplary embodiment.
Figure 2:
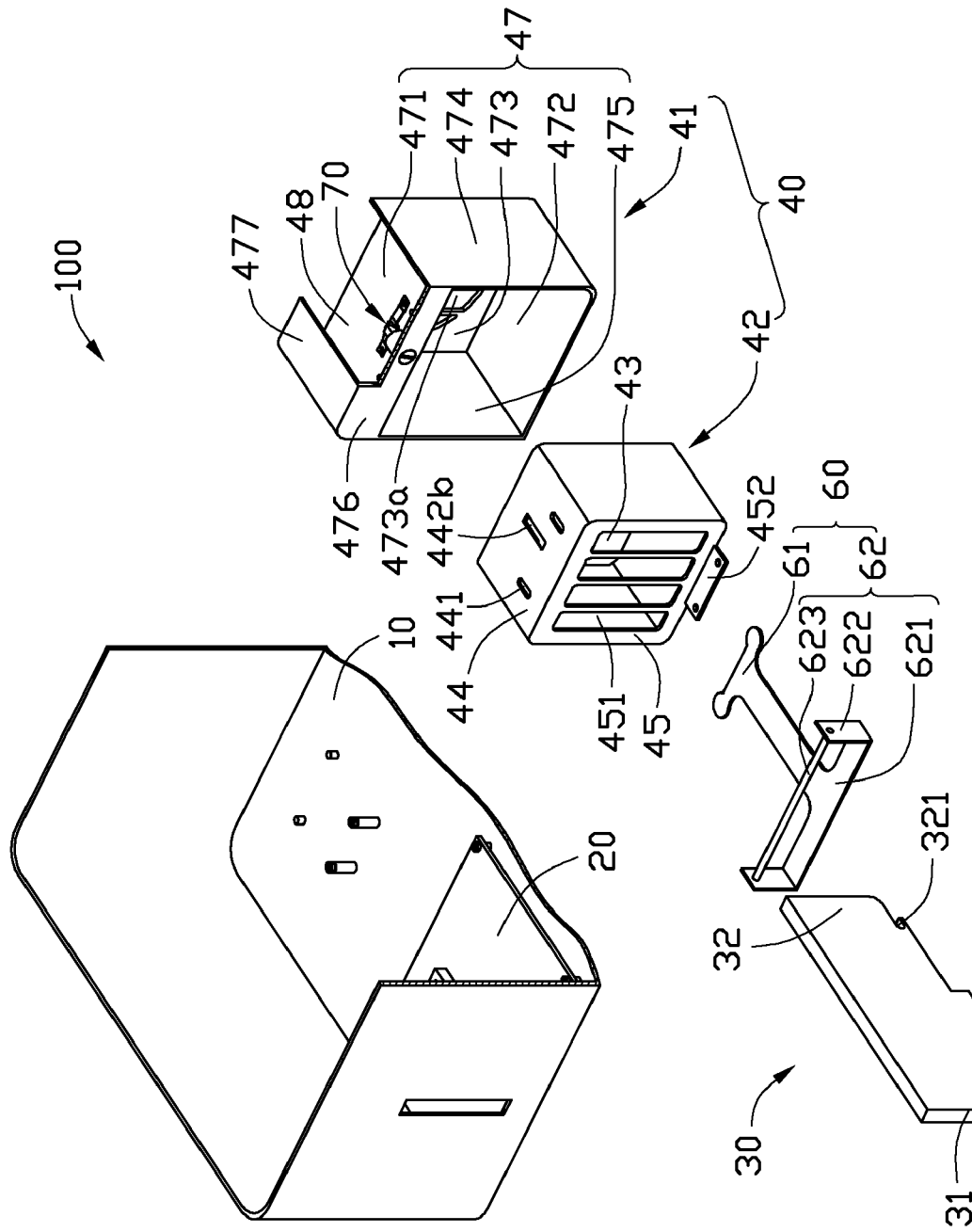
FIG. 2 is an exploded view of the electronic device of FIG. 1.

Referring to FIGS. 1 and 2, an electronic device 100 includes a case 10, a circuit board 20, an extension card 30, a cooling device 40, a connecting member 60, and an interconnection assembly 70. The circuit board 20 is secured inside the case 10. The extension card 30 is coupled to the circuit board 20. In this embodiment, the electronic device 100 is a personal computer, the circuit board 20 is a motherboard, and the extension card 30 is a graphics card.

The extension card 30 includes a front end 31 and a rear end 32. A fixing groove 321 is defined at the rear end 32 of the extension card 30. The front end 31 may include a plurality of sockets (not shown) for connecting other peripherals, e.g., monitors.

The cooling device 40 includes an outer casing 41 and an inner casing 42 received in the outer casing 41. The inner casing 42 defines a cavity 43 for receiving a cooling fan (not shown). The inner casing 42 includes a first side plate 44 and a second side plate 45 perpendicularly connected to the first side plate 44. A plurality of first through holes 451 are defined in the second side plate 45 corresponding to the extension card 30. A fixing plate 452 extends perpendicularly from the second side plate 45 towards the extension card 30. The inner casing 42 is movably attached to the case 10 via the fixing plates 452.

The outer casing 41 includes a substantially rectangular frame 47. The inner casing 42 is received in the frame 47. The frame 47 includes a first side wall 471, a second side wall 472 parallel to the first side wall 471, a third side wall 473 connecting the first side wall 471 to the second side wall 472, a fourth side wall 474, and a fifth side wall 475. The fourth side wall 474 perpendicularly connects to the first side wall 471, the second side wall 472 and the third side wall 473. The fifth side wall 475 perpendicularly connects to the first side wall 471, the second side wall 472 and the third side wall 473. The fifth side wall 475 is parallel to the fourth side wall 474. A plurality of second through holes 473a are defined in the third side wall 473 corresponding to the first through holes 451. The first through holes 451 and the second through holes 473a allow air to flow between the inner casing 42 and the outer casing 41.

The outer casing 41 further includes a sixth side wall 476 and a seventh side wall 477. The sixth side wall 476 extends from an end of the first side wall 471 at a direction opposite to that of the third side wall 473 extending from the first side wall 471. The seventh side wall 477 is perpendicularly connected to the sixth side wall 476 and parallel to the first side wall 471. The first side wall 471, the sixth side wall 476, and the seventh side wall 477 cooperatively define a receiving space 48.

Figure 3:
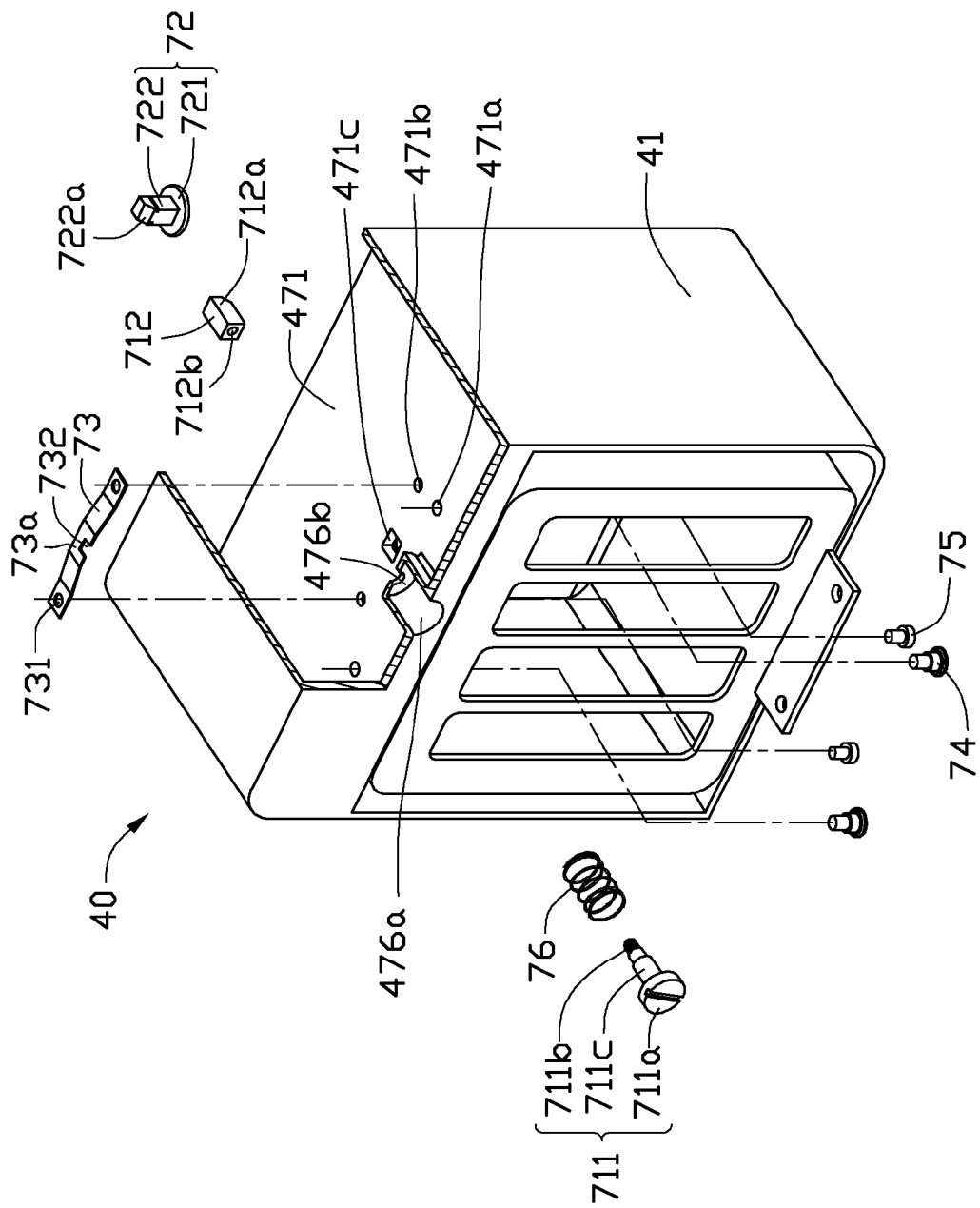
FIG. 3 is a cutaway and exploded view of the cooling device of FIG. 1.
Figure 6:
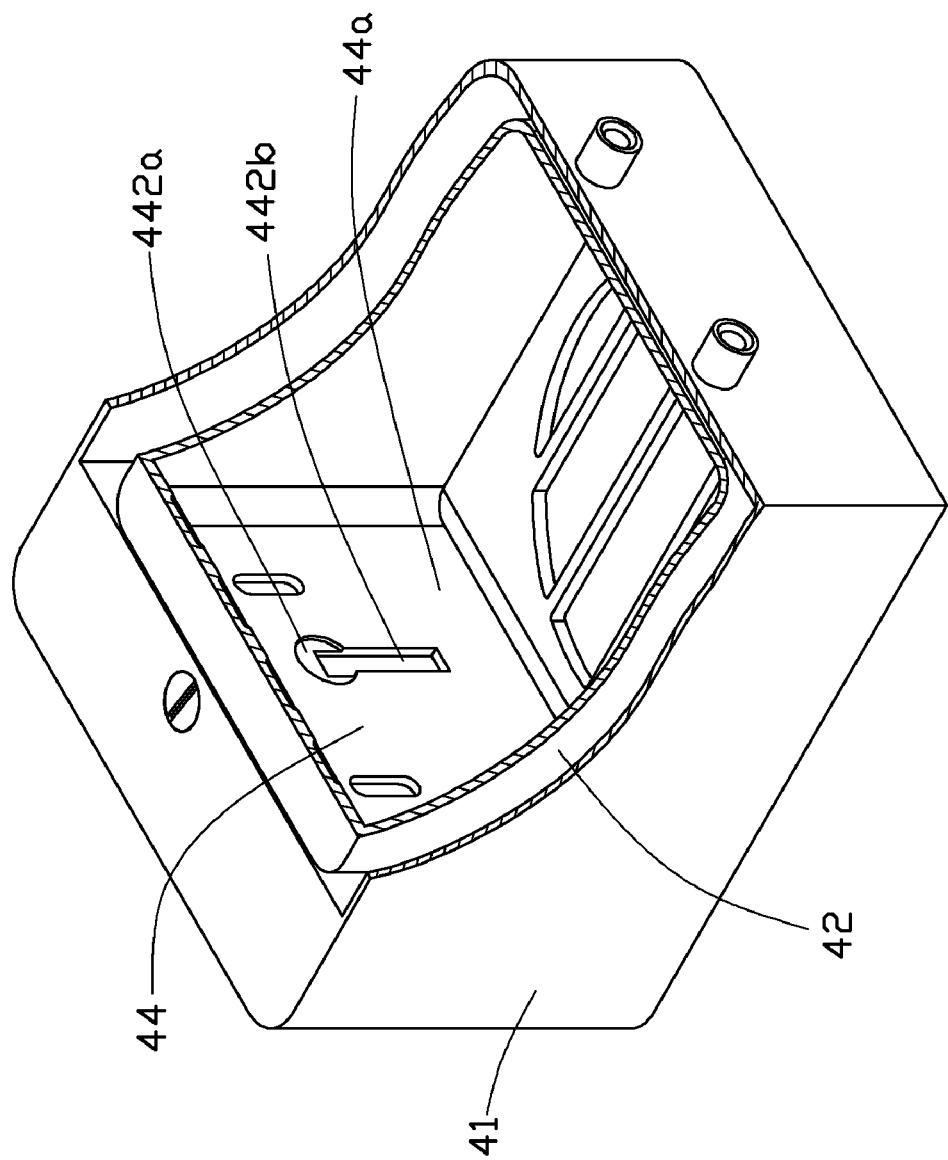
FIG. 6 is similar to FIG. 5, but viewed from another angle.

Further referring to FIG. 3, a stepped through hole 476a is defined in the sixth side wall 476 communicating with the receiving space 48. Two first threaded holes 471a and two second threaded holes 471b are defined in the first side wall 471 communicating with the receiving space 48. A receiving through hole 471c is defined in the first side wall 471 between two second threaded holes 471b. Two guiding slots 441 are defined in the first side plate 44 corresponding to the two first threaded holes 471 a. A connecting slot 442b is defined in an inner surface 44a of the first side plate 44 corresponding to the receiving through hole 471c. A circular groove 442a is defined in the inner surface 44a of the first side plate 44 and partially covers the connecting slot 442b (see FIG. 6).

Referring to FIGS. 1 and 2 again, the connecting member 60 includes a fixing end 61 and an engaging end 62. The fixing end 61 is fixedly mounted on an outer surface of the second side wall 472, thereby the connecting member 60 follows the movement of the outer casing 41. The engaging end 62 includes an elongated base 621, two arms 622, and an engaging rod 623. The two arms 622 correspondingly extend from two ends of the elongated base 621. The engaging rod 623 is supported by the arms 622. When the extension card 30 is coupled to the circuit board 20, the engaging rod 623 is engageable in the fixing groove 321, thereby fastening the extension card 30 to the circuit board 20.

Figure 5:
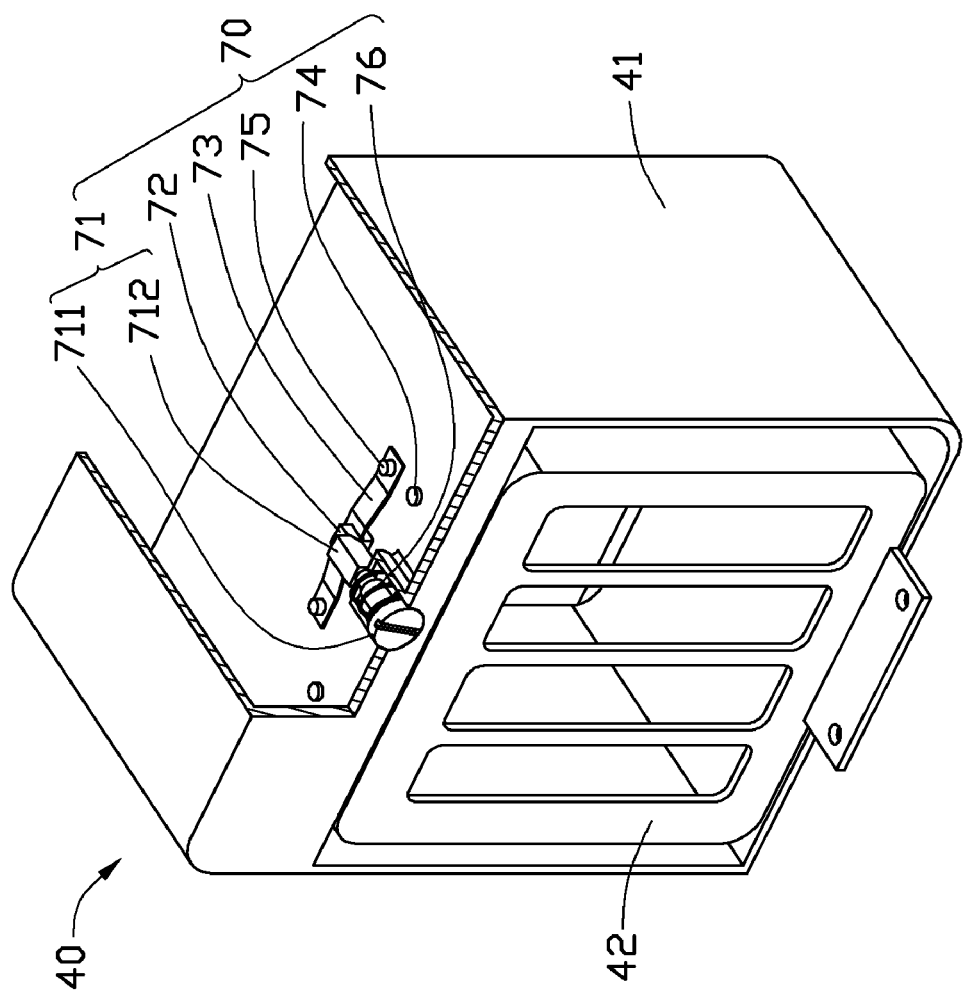
FIG. 5 is a cutaway, assembled view of the cooling device of FIG. 3.

Referring to FIGS. 3 and 5, the interconnection assembly 70 includes a controlling member 71, a slidable member 72, an elongated elastic plate 73, two first bolts 74, two second bolts 75, and an elastic member 76.

The controlling member 71 includes a pressable portion 711 and an abutting portion 712. The pressable portion 711 includes a pressable end 711a, a threaded end 711b, and a stepped rod 711c between the pressable end 711a and the threaded end 711b. A third threaded hole 712b is defined in the abutting portion 712 corresponding to the threaded end 711b. The pressable portion 711 is received in the stepped through hole 476a with the threaded end 711b extending from the stepped through hole 476a so that the threaded end 711b can be screwed in/engaged with the third threaded hole 712b to connect the pressable portion 711 to the abutting portion 712. The abutting portion 712 includes a first inclined structure 712a at an end of the abutting portion 712 away from the pressable portion 711. A height of the first inclined structure 712a decreases along a direction away from the pressable portion 711.

Figure 4:
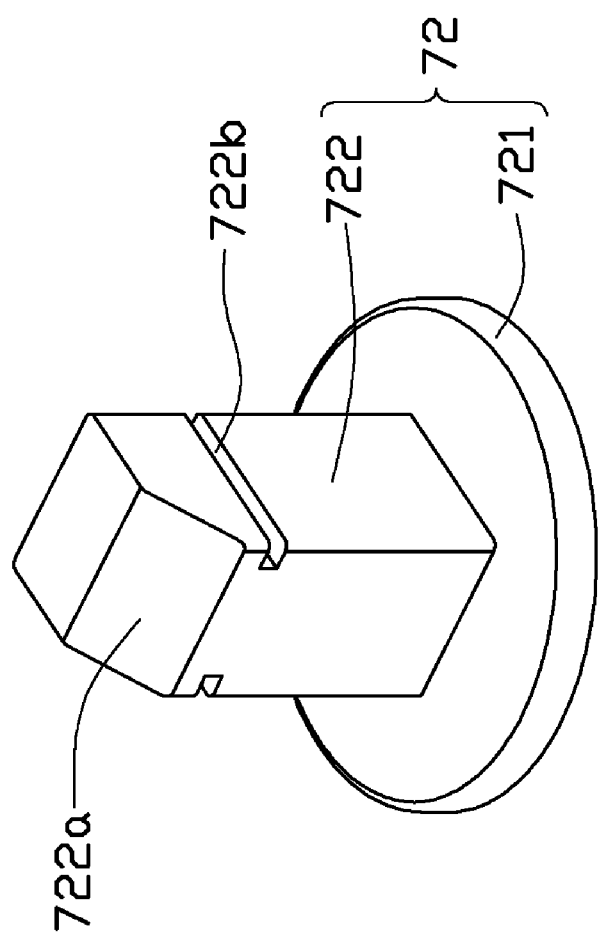
FIG. 4 is an enlarged view of a controlling member of the electronic device of FIG. 3.

Further referring to FIG. 4, the slidable member 72 includes a disc-shaped limiting plate 721 and a guiding rod 722 extending perpendicularly from the limiting plate 721. A diameter of the limiting plate 721 is slightly smaller than that of the circular groove 442a. The guiding rod 722 includes a second inclined structure 722a at a distal end abutting the first inclined structure 712a. A height of the second inclined structure 722a increases along the direction away from the pressable portion 711. Therefore, when the abutting portion 712 moves toward the slidable member 72, the slidable member 72 is pushed downwards by the abutting portion 712.

Two engaging grooves 722b are defined in two opposite outer surfaces of the guiding rod 722, respectively. The guiding rod 722 extends through the connecting slot 442b and the receiving through hole 471c. The limiting plate 721 is received in the circular groove 442a. When the slidable member 72 is moved toward the inner casing 42, the limiting plate 721 moves out of the circular groove 442a. Therefore, the slidable member 72 moves along the connecting slot 442b.

The elongated elastic plate 73 is arc-shaped. Two third threaded holes 731 are correspondingly defined in two ends of the elastic plate 73 corresponding to the two second threaded holes 471b. A cutout 732 is defined in a top portion 73a of the elastic plate 73. The slidable member 72 is secured to the elastic plate 73 with the guiding rod 722 engaged in the cutout 732.

Each of the two first bolts 74 extends through the guiding slot 441 and is screwed into the first threaded hole 471 a. Therefore, the outer casing 41 together with the two first bolts 74 can move along the two guiding slots 441. The second bolts 75 are screwed into the second threaded holes 471b and the third threaded holes 731 correspondingly so that the elastic plate 73 is fixed to the first side wall 471 of the outer casing 41.

The elastic member 76 is a coil spring. The elastic member 76 is compressively sleeved on the stepped rod 711c to abut the pressable end 711a and a stepped surface 476b of the stepped through hole 476a.

When the pressable portion 711 is depressed, the abutting portion 712 moves and pushes the slidable member 72 downwards. As a result, the limiting plate 721 moves out of the circular groove 442a, and the elastic plate 73 is compressed by the depressed slidable member 72. As a result, the outer casing 41 can be guided by the slidable member 72 to be moved away from the inner casing 42, and furthermore the connecting member 60 follows the movement of the outer casing 41 to unfasten the extension card 30.

To fasten the extension card 30, the outer casing 41 together with the connecting member 60 is moved toward the extension card 30, thereby the extension card 30 is fastened by the engaging rod 623 of the connecting member 60. The slidable member 72 is slid along the connecting slot 442b toward the extension card 30. As a result, the limiting plate 721 is received in the circular groove 442a by restoration of the elastic plate 73. Thus, the outer casing 41 is securely coupled to the inner casing 42.

The electronic device 100 can adopts the outer casing 41 and the inner casing 42 to fasten/unfasten the extension card 30 on the circuit board 20. Therefore, the extension card 30 can be securely coupled to the circuit board 20.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device, comprising:
a circuit board; and
an extension card coupled to the circuit board;
a cooling device comprising an outer casing and an inner casing received in the outer casing; and
a connecting member comprising a fixing end and an engaging end opposite to the fixing end, the fixing end fixedly mounted on the outer casing, the engaging end configured for fastening the extension card on the circuit board,
wherein the outer casing moves between a first position where the engaging end fastens the extension card and a second position where the engaging end is separated from the extension card to unfasten the extension card.

2. The electronic device of claim 1, wherein the extension card defines a fixing groove, the engaging end engaged in the fixing groove to fasten the extension card.

3. The electronic device of claim 2, wherein the engaging end comprises an elongated base, one arm extends from each end of the elongated base, and an engaging rod supported by the two arms, the engaging rod being engageable with the fixing groove of the extension card to fasten the extension card.

4. The electronic device of claim 1, wherein the outer casing comprises a substantially rectangular frame for receiving the inner casing.

5. The electronic device of claim 4, wherein the inner casing comprises a first side plate and a second side plate perpendicularly connected to the first side plate, a plurality of first through holes defined in the second side plate corresponding to the extension card, the rectangular frame comprising a first side wall, a second side wall parallel to the first side wall, and a third side wall connecting the first side wall to the second side wall, a plurality of second through holes defined in the third side wall corresponding to the first through holes.

6. The electronic device of claim 5, further comprising an interconnection assembly, the rectangular frame further comprising a fourth side wall, and a fifth side wall, the fourth side wall perpendicularly connecting to the first side wall, the second side wall and the third side wall, the fifth side wall parallel to the fourth side wall, the outer casing further comprising a sixth side wall and a seventh side wall, the sixth side wall extending from an end of the first side wall at a direction opposite to that of the third side wall extending from the first side wall, the seventh side wall perpendicularly connected to the sixth side wall and parallel to the first side wall, the first side wall, the sixth side wall and the seventh side wall cooperatively defining a receiving space for receiving the interconnection assembly.

7. The electronic device of claim 6, wherein a stepped through hole is defined in the sixth side wall communicating with the receiving space, two first threaded holes, two second threaded holes and a receiving through hole defined in the first side wall communicating with the receiving space, the receiving through hole between the two second threaded holes, two guiding slots defined in the first side plate corresponding to the two first threaded holes, a connecting slot defined in an inner surface of the first side plate corresponding to the receiving through hole, a circular groove defined in the inner surface of the first side plate and covering parts of the connecting slot.

8. The electronic device of claim 7, wherein the interconnecting assembly comprises a controlling member, a slidable member, an elongated elastic plate, at least one first bolt, the controlling member comprising a pressable portion and an abutting portion, the abutting portion comprising a first inclined structure at an end of the abutting portion away from the pressable portion, a height of the first inclined structure decreasing along a direction away from the pressable portion, the slidable member comprising a disc-shaped limiting plate received in the circular groove and a guiding rod extending perpendicularly from the limiting plate, the guiding rod comprising a second inclined structure at a distal end thereof and abutting the first inclined structure, a height of the second inclined structure increasing along the direction away from the pressable portion, the guiding rod extending through the connecting slot and the receiving through hole to engage with the elastic plate, the elastic plate fixed to the first side wall of the outer casing, the at least one first bolt extending through the guiding slot and screwed into at least one of the first threaded holes, the pressable portion received in the stepped through hole and connected to the abutting portion.

9. The electronic device of claim 8, wherein the limiting plate is received in the circular groove when the outer casing is at the first position, and the limiting plate is out of the circular groove when the outer casing is at the second position.

10. The electronic device of claim 8, wherein the interconnection assembly further comprises two second bolts, the elastic plate defining two third threaded holes in two ends of the elastic plate corresponding to the two second threaded holes, each of the second bolts screwed into the second threaded holes and the third threaded holes; respectively.

11. The electronic device of claim 8, wherein the pressable portion comprises a pressable end, a threaded end, and a stepped rod between the pressable end and the threaded end, a third threaded hole defined in the abutting portion corresponding to the threaded end, the pressable portion received in the stepped through hole with the threaded end extending from the stepped through hole.

12. The electronic device of claim 8, wherein the elastic plate is arc-shaped, and a cutout is defined in a top portion of the elastic plate, the slidable member secured to the elastic plate with the guiding rod engaged in the cutout.

13. The electronic device of claim 11, wherein the interconnection assembly further comprises an elastic member, the elastic member compressively being sleeved on the stepped rod to abut the pressable end and a stepped surface of the stepped through hole.

* * * * *